US011169412B2

United States Patent
Yuan et al.

(10) Patent No.: US 11,169,412 B2
(45) Date of Patent: Nov. 9, 2021

(54) STACKED DISPLAY PANEL, MANUFACTURING METHOD THEREOF, AND DISPLAY DEVICE

(71) Applicant: BOE TECHNOLOGY GROUP CO., LTD., Beijing (CN)

(72) Inventors: Guangcai Yuan, Beijing (CN); Haixu Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/825,781

(22) Filed: Mar. 20, 2020

(65) Prior Publication Data
US 2021/0072591 A1    Mar. 11, 2021

(30) Foreign Application Priority Data
Sep. 11, 2019   (CN) .......................... 201910859730.X

(51) Int. Cl.
*G02F 1/1335*   (2006.01)
*G02F 1/1347*   (2006.01)

(52) U.S. Cl.
CPC .... *G02F 1/133528* (2013.01); *G02F 1/13471* (2013.01); *G02F 1/133514* (2013.01);
(Continued)

(58) Field of Classification Search
CPC .... G02B 5/3033; G02B 5/3025; G02B 27/26; G02B 5/3058; Y10T 428/1041;
(Continued)

(56) References Cited

U.S. PATENT DOCUMENTS 6,184,951 B1 * 2/2001 Harrold ............... G02F 1/13473
349/117
2009/0109351 A1 * 4/2009 Shiomi ................. G02F 1/1347
348/790
(Continued)

FOREIGN PATENT DOCUMENTS

CN    101295104 A    10/2008
CN    102385195 A    3/2012
(Continued)

OTHER PUBLICATIONS

Chinese Office Action corresponding to CN 201910859730.X; dated Aug. 4, 2021 (18 pages, including English translation).

*Primary Examiner* — Jia X Pan
(74) *Attorney, Agent, or Firm* — Myers Bigel, P.A.

(57) ABSTRACT

The present disclosure provides a stacked display panel, a manufacturing method, and a display device. The stacked display panel includes a first display substrate, a second display substrate, and a third display substrate arranged in sequence. A color filter layer is on a side of the second display substrate facing the first display substrate, and a polarizing layer is on a side of the second display substrate facing the third display substrate. A first polarizer is on a side of the first display substrate facing away from the second display substrate, and a transmission axis direction of the first polarizer and a transmission axis direction of the polarizing layer are perpendicular to each other. A second polarizer is on a side of the third display substrate facing away from the second display substrate, and transmission axis directions of the second polarizer and the polarizing layer are perpendicular to each other.

12 Claims, 3 Drawing Sheets

(52) U.S. Cl.
    CPC .. *G02F 1/133516* (2013.01); *G02F 1/133531* (2021.01); *G02F 1/133548* (2021.01)

(58) Field of Classification Search
    CPC ........... G02F 1/133528; G02F 1/13362; G02F 2001/133548; G02F 1/133548; G02F 1/1347; G02F 1/13471; G02F 1/133531; G02F 1/133514; G09G 2300/023
    See application file for complete search history.

(56) References Cited

U.S. PATENT DOCUMENTS

| | | | |
|---|---|---|---|
| 2009/0147186 A1* | 6/2009 | Nakai | G09G 3/3406 349/74 |
| 2013/0033662 A1* | 2/2013 | Chung | G02F 1/133528 349/96 |
| 2013/0038811 A1* | 2/2013 | Sugita | G02B 3/12 349/61 |
| 2018/0081229 A1* | 3/2018 | Ono | G02F 1/13471 |
| 2020/0301200 A1 | 9/2020 | Im | |

FOREIGN PATENT DOCUMENTS

| | | |
|---|---|---|
| CN | 103185985 A | 7/2013 |
| CN | 106405920 A | 2/2017 |
| CN | 206020873 U | 3/2017 |
| CN | 106707604 A | 5/2017 |
| CN | 108983485 A | 12/2018 |
| CN | 109031763 A | 12/2018 |
| CN | 109870859 A | 6/2019 |
| EP | 1072931 A2 | 1/2001 |

\* cited by examiner

STACKED DISPLAY PANEL, MANUFACTURING METHOD THEREOF, AND DISPLAY DEVICE

RELATED APPLICATION

The present application claims the benefit of Chinese Patent Application No. 201910859730.X, filed on Sep. 11, 2019, the entire disclosure of which is incorporated herein by reference.

TECHNICAL FIELD

The present disclosure relates to the field of display technologies, in particular to the field of dual cell display, especially a stacked display panel, a manufacturing method thereof, and a display device.

BACKGROUND

A conventional dual cell liquid crystal display panel is a combination of four display substrates and three polarizers, where two display substrates form one liquid crystal cell and the other two display substrates form another liquid crystal cell.

The related dual cell liquid crystal display panel includes four glass substrates, and the production cost is relatively high.

SUMMARY

In a first aspect, the present disclosure provides a stacked display panel. The stacked display panel includes a first display substrate, a second display substrate, and a third display substrate arranged in sequence. A color filter layer is on a side of the second display substrate facing the first display substrate, and a polarizing layer is on a side of the second display substrate facing the third display substrate. A first polarizer is on a side of the first display substrate facing away from the second display substrate, and a transmission axis direction of the first polarizer and a transmission axis direction of the polarizing layer are perpendicular to each other. A second polarizer is on a side of the third display substrate facing away from the second display substrate, and a transmission axis direction of the second polarizer and the transmission axis direction of the polarizing layer are perpendicular to each other. The first polarizer and the second polarizer are thin film polarizers, and the polarizing layer comprises a grating layer. The first display substrate and the second display substrate constitute a first panel, the second display substrate and the third display substrate constitute a second panel, and a resolution of the first panel is higher than a resolution of the second panel.

In some embodiments, the first panel comprises a plurality of first pixel units, the second panel comprises a plurality of second pixel units, and an orthographic projection of any one of the second pixel units on the first panel completely covers multiple first pixel units.

In some embodiments, the color filter layer comprises a plurality of filter regions, each of the first pixel units comprises a plurality of sub-pixel units, and respective one of the plurality of filter regions corresponds to respective one of the plurality of sub-pixel units.

In some embodiments, the second display substrate is on a light incident side of the first panel, and the first display substrate is on a light exit side of the first panel.

In some embodiments, the second display substrate is on a light exit side of the second panel, and the third display substrate is on a light incident side of the second panel.

In some embodiments, a first thin film transistor layer is on a side of the first display substrate facing the second display substrate, and a first liquid crystal layer is between the first thin film transistor layer and the second display substrate.

In some embodiments, a second thin film transistor layer is on a side of the third display substrate facing the second display substrate, and a second liquid crystal layer is between the second thin film transistor layer and the second display substrate.

In some embodiments, the grating layer comprises a plurality of light transmitting portions distributed at intervals, and a width of a light transmitting portion is 80 nm to 120 nm.

In some embodiments, a light blocking portions is between two adjacent light transmitting portions, and a width of the light blocking portion is 80 nm to 120 nm.

In some embodiments, a height of the light blocking portion is 100 nm to 150 nm.

In a second aspect, the present disclosure provides a display device comprising any one of the above stacked display panels.

In a third aspect, the present disclosure provides a method for manufacturing the above stacked display panel. The method comprises following steps: providing a first display substrate, a second display substrate, and a third display substrate, wherein providing the second display substrate comprises: forming a color filter layer and a polarizing layer on a transparent base substrate respectively, the color filter layer and the polarizing layer being on opposite sides of the transparent base substrate; providing a first polarizer on a side of the first display substrate; providing a second polarizer on a side of the third display substrate; and arranging the first display substrate, the second display substrate and the third display substrate in sequence, wherein the color filter layer is on a side of the second display substrate facing the first display substrate, the polarizing layer is on a side of the second display substrate facing the third display substrate, the first polarizer is on a side of the first display substrate facing away from the second display substrate, and the second polarizer is on a side of the third display substrate facing away from the second display substrate. The first polarizer and the second polarizer are thin film polarizers, and the polarizing layer comprises a grating layer. The first display substrate and the second display substrate constitute a first panel, the second display substrate and the third display substrate constitute a second panel, and a resolution of the first panel is higher than a resolution of the second panel.

BRIEF DESCRIPTION OF THE DRAWINGS

Other features, objects, and advantages of the present application will become more apparent by reading the detailed description of the non-limiting embodiments with reference to the following drawings. In the drawings.

DETAILED DESCRIPTION OF THE DISCLOSURE

Figure 1:
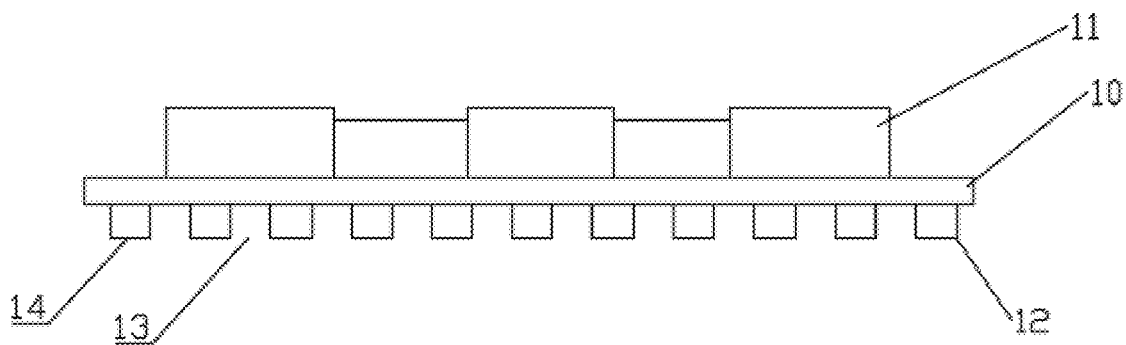
FIG. 1 is a schematic structural diagram of a display substrate according to an embodiment of the present disclosure.

The present application will be described below in detail with reference to the accompanying drawings and embodiments. It should be noted that the specific embodiments described herein are only used to explain the related disclosure, rather than limiting the disclosure. It should also be noted that, for ease of description, only parts related to disclosure are shown in the drawings.

It should be noted that, the embodiments in the present application and the features in the embodiments can be combined without conflicting with each other. The application will be described in detail below with reference to the drawings and embodiments.

Embodiments of the present disclosure provide a display substrate. Referring to FIG. 1, the display substrate includes a transparent base substrate 10, a color filter layer 11 and a polarizing layer 12. The color filter layer 11 and the polarizing layer 12 are on opposite sides of the transparent base substrate 10.

In the embodiments of the present disclosure, the color filter layer and the polarizing layer are disposed on opposite sides of the same transparent base substrate, thereby reducing the number of base substrates used in the dual cell LCD panel, thus reducing production cost. Meanwhile, compared with the related dual cell LCD panel which needs to perform hard bonding in the production process, arranging the color filter layer and the polarizing layer on opposite sides of the same transparent base substrate can reduce the loss of transmission of the display panel and reduce the difficulty of manufacturing the display panel.

Further, the polarizing layer 12 includes a grating layer, and the grating layer includes a plurality of light transmitting portions 13 distributed at intervals, and a width of the light transmitting portions 13 is 80 nm to 120 nm.

In the embodiments of the present disclosure, the polarizing layer can absorb the electric field component of the light beam parallel to the direction of the light transmitting portion arrangement, and only the electric field component of the light beam perpendicular to the direction of the light transmitting portion arrangement can pass through. When a picture needs to be displayed on the display panel, the light beams corresponding to the pixels to be lit pass through the polarizing layer. The width of the light transmitting part is 80 nm to 120 nm, which can ensure the light transmitting effect of the polarizing layer.

Further, a light blocking portion 14 is between two adjacent light transmitting portions 13, and a width of the light blocking portion 14 is 80 nm to 120 nm, which can ensure the light blocking effect of the polarizing layer.

Further, a height of the light blocking portion 14 is 100 nm to 150 nm, and a material of the light blocking portion 14 may be, but is not limited to, aluminum. It can ensure the light blocking effect of the polarizing layer, reduce the difficulty of processing the polarizing layer, and improve the reliability of the polarizing layer.

Figure 2:
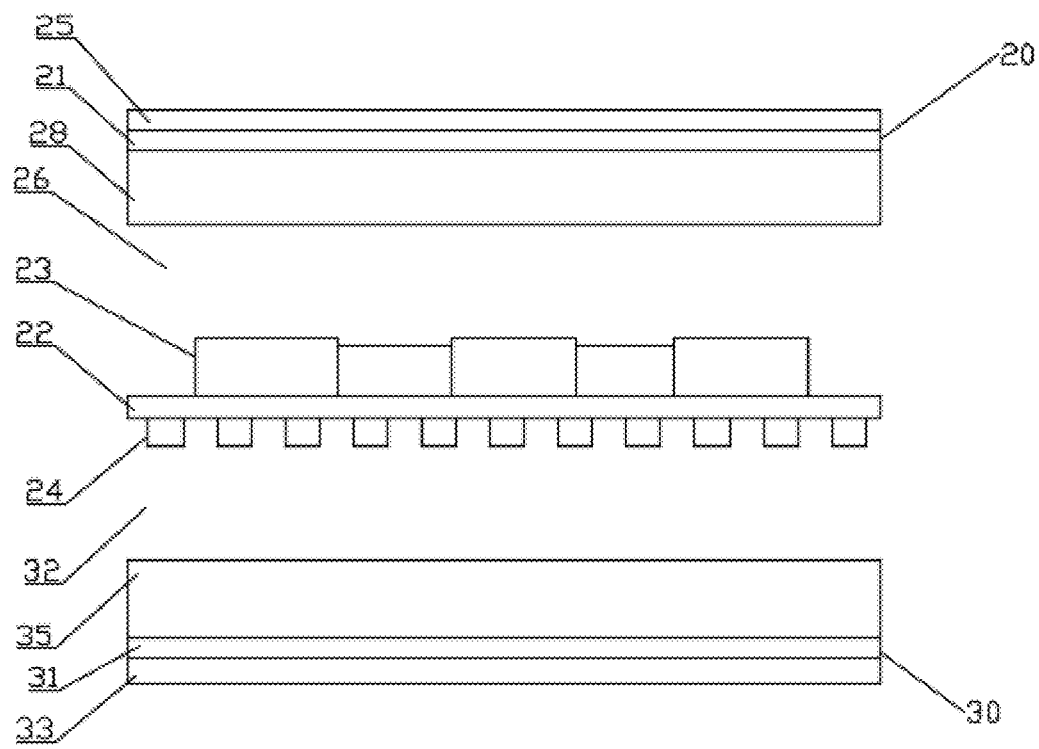
FIG. 2 is a schematic structural diagram of a stacked display panel according to an embodiment of the present disclosure.

Embodiments of the present disclosure also provide a stacked display panel. Referring to FIG. 2, the stacked display panel includes a first display substrate 21, a second display substrate 22 and a third display substrate 31 arranged in sequence. A color filter layer 23 is on a side of the second display substrate 22 facing the first display substrate 21, and a polarizing layer 24 is on a side of the second display substrate 22 facing the third display substrate 31. A first polarizer 25 is on a side of the first display substrate 21 facing away from the second display substrate 22, and a transmission axis direction of the first polarizer 25 and a transmission axis direction of the polarizing layer 24 are perpendicular to each other. A second polarizer 33 is on a side of the third display substrate 31 facing away from the second display substrate 22, and a transmission axis direction of the second polarizer 33 and the transmission axis direction of the polarizing layer 24 are perpendicular to each other. The first polarizer 25 and the second polarizer 33 are thin film polarizers, and the polarizing layer 24 comprises a grating layer. The first display substrate and the second display substrate constitute a first panel 20, the second display substrate and the third display substrate constitute a second panel 30, and a resolution of the first panel 20 is higher than a resolution of the second panel 30.

In the embodiments of the present disclosure, the color filter layer can convert white light incident from the first panel into red light, blue light, and green light. The first polarizer can transmit or block light through the cooperation of the first polarizer and the polarizing layer, and the polarizing layer can transmit or block light through the cooperation of the polarizing layer and the second polarizer. The color filter layer and the polarizing layer are disposed on opposite sides of the same second display substrate, thereby reducing the number of display substrates used in the dual cell LCD panel, thus reducing production cost, and reducing the thickness of the display panel, which facilitate achieving thin and light display panel. Meanwhile, compared with the related dual cell LCD panel which needs to perform hard bonding in the production process, arranging the color filter layer and the polarizing layer on opposite sides of the same second substrate can reduce the loss of transmission of the display panel and reduce the difficulty of manufacturing the display panel.

The first display substrate may be, but is not limited to, a glass transparent substrate or a flexible transparent substrate, and the third display substrate may be, but is not limited to, a glass transparent substrate or a flexible transparent substrate.

When the screen displays black, the polarizing layer and the first polarizer can respectively block light transmission. Compared with the single cell LCD panel, the dual cell LCD panel has a higher contrast and a better display effect.

In the embodiments of the present disclosure, the first panel is used for display, and the second panel is used for converting incident light into area light. The area light is light that is bright in some areas and dark in some areas. The resolution of the first panel is higher than that of the second panel, which can ensure the display effect of the display panel, and can control the production cost at the same time.

Figure 3:
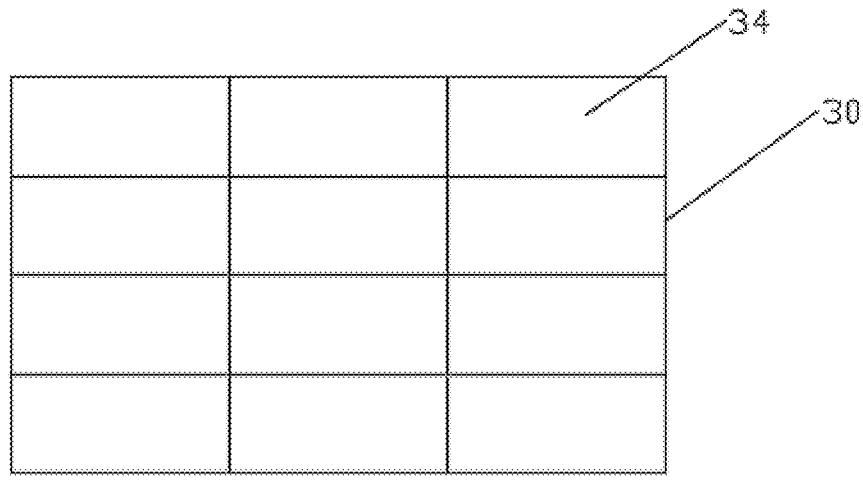
FIG. 3 is a schematic diagram of pixels a second panel of a stacked display panel according to an embodiment of the present disclosure.
Figure 4:
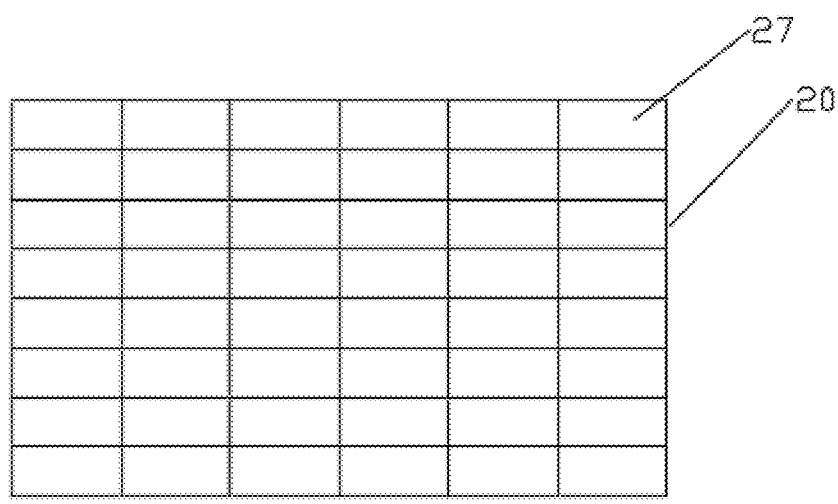
FIG. 4 is a schematic diagram of pixels of a first panel of a stacked display panel according to an embodiment of the present disclosure.
Figure 5:
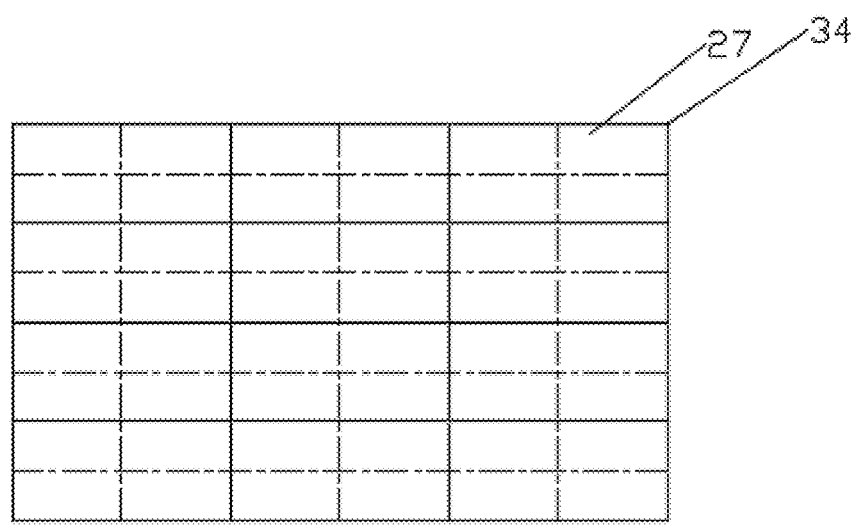
FIG. 5 is a schematic diagram of pixels of a stacked display panel according to an embodiment of the present disclosure.

Referring to FIGS. 3-5, further, the first panel 20 includes a plurality of first pixel units 27, the second panel 30 includes a plurality of second pixel units 34, and an orthographic projection of any one of the second pixel units 34 on the first panel 20 completely covers multiple first pixel units 27.

In the embodiment of the present disclosure, the resolution of the second panel shown in FIG. 3 is 2K, the resolution of the first panel shown in FIG. 4 is 4K, and the resolution of the display panel shown in FIG. 5 is 4K. In order to facilitate understanding, detailed description is made with reference to FIGS. 3-5, but the protection scope of the present application is not limited by the specific arrangement manners listed in FIGS. 3-5. The area of the second pixel unit is larger than the area of the first pixel unit, and multiple first pixel units correspond to one second pixel unit. Referring to FIG. 5, the dotted line schematically shows the arrangement of the first pixel units on the first panel, and the solid line schematically shows the arrangement of the second pixel units on the second panel. Four first pixel units correspond to one second pixel unit. When the display panel is displaying, it is easier to control the display screen, which can avoid display disorder of the display panel, improve the contrast of the display panel, and improve the display effect of the display panel.

Further, the color filter layer 23 includes a plurality of filter regions, each of the first pixel units 27 includes a plurality of sub-pixel units, and respective one of the plurality of filter regions corresponds to respective one of the plurality of sub-pixel units.

In the embodiments of the present disclosure, when the display panel performs display, the resolution of the first panel is taken as the resolution of the display panel, and respective one of the plurality of filter regions of the color filter layer corresponds to respective one of the plurality of sub-pixel units of the first pixel unit. It is convenient for the display panel to display, and can ensure the display effect of the display panel.

Further, the second display substrate 22 is on the light incident side of the first panel 20, and the first display substrate 21 is on the light exit side of the first panel 20.

Further, the second display substrate 22 is on the light exit side of the second panel 30, and the third display substrate 31 is on the light incident side of the second panel 30.

In the embodiments of the present disclosure, the light path is reasonably arranged. When the screen displays black, the polarizing layer and the first polarizer can respectively block light transmission. Compared with the single cell LCD panel, the dual cell LCD panel has a higher contrast and a better display effect.

Light incidents from the third display substrate, passes through the second display substrate, and exits from the first display substrate. Compared with the related dual cell LCD panel in which light needs to pass through four display substrates, in the display panel of the present application, light only needs to pass through three display substrates. Therefore, the display panel of the present application can reduce the loss of the light transmission.

Further, a first thin film transistor layer 28 is disposed on a side of the first display substrate 21 facing the second display substrate 22, and a first liquid crystal layer 26 is disposed between the first thin film transistor layer 28 and the second display substrate 22.

In the embodiments of the present disclosure, the first liquid crystal layer is provided between the first display substrate and the second display substrate. The first liquid crystal layer is capable of rotating light entering the first liquid crystal layer, and the rotation angle of the light is controlled by the voltage on both sides of the first liquid crystal layer, which is controlled by the first thin film transistor layer, and then whether the light passes through the first display substrate can be controlled.

Further, a second thin film transistor layer 35 is disposed on a side of the third display substrate 31 facing the second display substrate 22, and a second liquid crystal layer 32 is disposed between the second thin film transistor layer 35 and the second display substrate 22.

In the embodiments of the present disclosure, the second liquid crystal layer is provided between the second display substrate and the third display substrate. The second liquid crystal layer is capable of rotating light entering the second liquid crystal layer, and the rotation angle of the light is controlled by the voltage on both sides of the second liquid crystal layer, which is controlled by the second thin film transistor layer, and then whether the light passes through the second display substrate can be controlled.

Embodiments of the present disclosure also provide a display device including the above stacked display panel.

Embodiments of the present disclosure also provide a method for manufacturing a display substrate. Referring to FIG. 1, the method includes the following steps: providing a transparent base substrate 10; forming a polarizing layer 12 on one side of the transparent base substrate 10; and forming a color filter layer 11 on the other side of the transparent base substrate 10. The color filter layer 11 and the polarizing layer 12 are on opposite sides of the transparent base substrate 10.

In the embodiments of the present disclosure, the color filter layer and the polarizing layer are disposed on opposite sides of the same transparent base substrate, thereby reducing the number of base substrates used in the dual cell LCD panel, thus reducing production cost. Meanwhile, compared with the related dual cell LCD panel which needs to perform hard bonding in the production process, arranging the color filter layer and the polarizing layer on opposite sides of the same transparent base substrate can reduce the loss of transmission of the display panel and reduce the difficulty of manufacturing the display panel.

Embodiments of the present disclosure also provide a method for manufacturing a stacked display panel. Referring to FIG. 2, the method includes the following steps: providing a first display substrate 21, a second display substrate 22, and a third display substrate 31, wherein providing the second display substrate includes: forming a color filter layer and a polarizing layer on a transparent base substrate respectively, the color filter layer and the polarizing layer being on opposite sides of the transparent base substrate; providing a first polarizer 25 on a side of the first display substrate 21; providing a second polarizer 33 on a side of the third display substrate 31; and arranging the first display substrate 21, the second display substrate 22 and the third display substrate 31 in sequence, wherein the color filter layer 23 is on a side of the second display substrate 22 facing the first display substrate 21, the polarizing layer 24 is on a side of the second display substrate 22 facing the third display substrate 31, the first polarizer 25 is on a side of the first display substrate 21 facing away from the second display substrate 22, and the second polarizer 33 is on a side of the third display substrate 31 facing away from the second display substrate 22. The first polarizer 25 and the second polarizer 33 are thin film polarizers, and the polarizing layer 24 includes a grating layer. The first display substrate and the second display substrate constitute a first panel 20, the second display substrate and the third display substrate constitute a second panel 30, and a resolution of the first panel 20 is higher than a resolution of the second panel 30.

In the embodiments of the present disclosure, the color filter layer can convert white light incident from the first panel into red light, blue light, and green light. The first polarizer can transmit or block light through the cooperation of the first polarizer and the polarizing layer, and the polarizing layer can transmit or block light through the cooperation of the polarizing layer and the second polarizer. The color filter layer and the polarizing layer are disposed on opposite sides of the same second display substrate, thereby reducing the number of display substrates used in the dual cell LCD panel, thus reducing production cost, and reducing the thickness of the display panel, which facilitate achieving thin and light display panel. Meanwhile, compared with the related dual cell LCD panel which needs to perform hard bonding in the production process, arranging the color filter layer and the polarizing layer on opposite sides of the same second substrate can reduce the loss of transmission of the display panel and reduce the difficulty of manufacturing the display panel.

When the screen displays black, the first panel and the second panel can respectively block light transmission. Compared with the single cell LCD panel, the dual cell LCD panel has a higher contrast and a better display effect.

The above descriptions are only some preferred embodiments of the present application and an explanation of the applied technical principles. Those skilled in the art should understand that the scope of disclosure in this application is not limited to the technical solutions of the specific combination of the above technical features, but also covers other technical solutions formed by any combination of the above technical features or other equivalent features without departing from the disclosed concept, such as a technical solution formed by replacing the above features with technical features with (but not limited to) similar functions disclosed in the present application.

The invention claimed is:

1. A stacked display panel comprising:
   a first display substrate, a second display substrate, and a third display substrate arranged in sequence,
   wherein a color filter layer is on a surface of the second display substrate facing the first display substrate, and a polarizing layer is on a surface of the second display substrate facing the third display substrate,
   wherein a first polarizer is on a side of the first display substrate facing away from the second display substrate, and a transmission axis direction of the first polarizer and a transmission axis direction of the polarizing layer are perpendicular to each other,
   wherein a second polarizer is on a side of the third display substrate facing away from the second display substrate, and a transmission axis direction of the second polarizer and the transmission axis direction of the polarizing layer are perpendicular to each other,
   wherein the first polarizer and the second polarizer are thin film polarizers, the polarizing layer comprises a grating layer, and a thickness of the polarizing layer is in a range of 100 nm-150 nm,
   wherein the first display substrate and the second display substrate constitute a first panel, the second display substrate and the third display substrate constitute a second panel, and
   wherein a resolution of the first panel is higher than a resolution of the second panel.

2. The stacked display panel according to claim 1, wherein the first panel comprises a plurality of first pixel units, the second panel comprises a plurality of second pixel units, and
   wherein an orthographic projection of one of the second pixel units on the first panel completely overlaps multiple first pixel units.

3. The stacked display panel according to claim 2, wherein the color filter layer comprises a plurality of filter regions,
   wherein each of the first pixel units comprises a plurality of sub-pixel units, and
   wherein a respective one of the plurality of filter regions corresponds to a respective one of the plurality of sub-pixel units.

4. The stacked display panel according to claim 1, wherein the second display substrate is on a light incident side of the first panel, and
   wherein the first display substrate is on a light exit side of the first panel.

5. The stacked display panel according to claim 1, wherein the second display substrate is on a light exit side of the second panel, and
   wherein the third display substrate is on a light incident side of the second panel.

6. The stacked display panel according to claim 1, wherein a first thin film transistor layer is on a side of the first display substrate facing the second display substrate, and
   wherein a first liquid crystal layer is between the first thin film transistor layer and the second display substrate.

7. The stacked display panel according to claim 1, wherein a second thin film transistor layer is on a side of the third display substrate facing the second display substrate, and
   wherein a second liquid crystal layer is between the second thin film transistor layer and the second display substrate.

8. The stacked display panel according to claim 1, wherein the grating layer comprises a plurality of light transmitting portions distributed at intervals, and
   wherein a width of a light transmitting portion is 80 nm to 120 nm.

9. The stacked display panel according to claim 8, wherein a light blocking portion is between two adjacent light transmitting portions, and
   wherein a width of the light blocking portion is 80 nm to 120 nm.

10. The stacked display panel according to claim 9, wherein a height of the light blocking portion is 100 nm to 150 nm.

11. A display device comprising the stacked display panel according to claim 1.

12. A method for manufacturing a stacked display panel, comprising
    providing a first display substrate, a second display substrate, and a third display substrate, wherein providing the second display substrate comprises:
    forming a color filter layer and a polarizing layer on a transparent base substrate respectively, wherein the color filter layer and the polarizing layer are on opposite sides of the transparent base substrate;
    providing a first polarizer on a side of the first display substrate;
    providing a second polarizer on a side of the third display substrate; and
    arranging the first display substrate, the second display substrate and the third display substrate in sequence,
    wherein the color filter layer is on a surface of the second display substrate facing the first display substrate, the polarizing layer is on a surface of the second display substrate facing the third display substrate, the first polarizer is on a side of the first display substrate facing away from the second display substrate, and the second polarizer is on a side of the third display substrate facing away from the second display substrate, wherein a transmission axis direction of the first polarizer and a transmission axis direction of the polarizing layer are perpendicular to each other, wherein a transmission axis direction of the second polarizer and the transmission axis direction of the polarizing layer are perpendicular to each other, wherein the first polarizer and the second polarizer are thin film polarizers, the polarizing layer comprises a grating layer, and a thickness of the polarizing layer is in a range of 100 nm-150 nm, wherein the first display substrate and the second display substrate constitute a first panel, the second display substrate and the third display substrate constitute a second panel, and wherein a resolution of the first panel is higher than a resolution of the second panel.

\* \* \* \* \*